United States Patent Office 2,970,885
Patented Feb. 7, 1961

2,970,885
CORROSION REDUCTION

Sherman Greenberg, Chicago, Ill., Robert D. Misch, Whiting, Ind., and Westly E. Ruther, Skokie, Ill., assignors to the United States of America as represented by the United States Atomic Energy Commission No Drawing. Filed Apr. 6, 1959, Ser. No. 804,549

1 Claim. (Cl. 21—2.7)

The invention relates to a method for reducing corrosion of magnesium alloys under conditions encountered in nuclear reactors having aqueous coolants or moderators.

Magnesium metal, although attractive as a structural material for nuclear reactors due to its unusually low thermal neutron absorption cross-section of about 0.059 barn, has not been used in reactors having aqueous coolants or moderators due to its corrodibility by such liquids at the high temperatures created by operation of the reactors. Because of this all reactors with such coolants or moderators have had to employ as structural materials metals with higher thermal neutron absorption cross-sections such as aluminum or zirconium; since these metals are in intimate association with the fissionable material, for example, as cladding for uranium fuel rods, their absorption cross-section affects the neutron flux density within the reactor. For any reactor system of a given power level a limiting flux density value exists by reason of the structural material used, which cannot be increased by any modification of design. Scientists are therefore anxious to employ magnesium as a structural material since it would permit the creation of greater neutron flux densities than are now available for experiments with neutrons and their interaction with matter and other nuclear particles, all of which are but imperfectly understood.

*Table 1.—Corrosion of commercial magnesium alloys in initially pure water at 150° C.*

| Alloy | Nominal Composition | Average Corr. Rate, Mil/days | Test Time, Days |
|---|---|---|---|
| Pure Mg (Domal) | 99.97+Mg | Disintegrate | 1.7 |
| AZ31 | Al 2.5-3.5; Zn 0.7-1.3; Mn 0.2. | 3.2 | 2.7 |
| PE | Al 3.2; Zn 1.0; Mn 0.1 | 3.5 | 2.9 |
| AZ91 | Al 8-9; Zn 0.4-1.0; Mn 0.13; Ni 0.01; Si 0.3. | 3.1 | 1.7 |
| HZ32 (ZT1) | Th 2.5-4.0; Zn 2.5; Zr 0.7. | 1.2 | 2.7 |
| EK41A[1] | Rare Earths 3-5; Zr 0.4-1.0; Zn 0.3. | Disintegrate | 5.0 |
| A3XA[1] | Al 2.5-3.5 | do | 5.0 |

[1] From data of N. Grant, Reactor Engineering Division, ANL EK41A was tested at 140° C.

*Table 2.—Corrosion of developmental magnesium alloys in initially pure water at 150° C.*

| Alloy | Composition, Wt. Percent | | | | | | | | | | Test Time, Days | Corrosion Rate | |
|---|---|---|---|---|---|---|---|---|---|---|---|---|---|
| | Al | Ce | Cu | Mn | Ni | Pb | Sn | Ti | Zn | Zr | | mg./cm.²/day | mils/day |
| M1[1] | | | | | | | | | | 1 | 0.8 | (4) | |
| M2 | | 0.5 | | | | | | | | | 2.7 | (4) | |
| M3 | 5 | | | 0.1 | 0.5 | | | | | | 0.9 / 4.8 | 8.6 / 7.9 | 2.0 / 1.8 |
| M3X | 5 | | | 0.1 | 0.5 | | | | | | 0.9 / 4.8 | 9.6 / 11.4 | 2.2 / 2.6 |
| M4 | 15 | | | | | | | | | | 0.9 / 4.8 | 12.9 / 10.8 | 3.0 / 2.5 |
| M5 | 5 | | | | | | | | | | 0.9 | 59.2 | 13.7 |
| M6 | 5 | 0.1 | | | | | | | | 0.5 | 0.9 | 30.5 | 7.1 |
| M7 | 5 | 0.1 | 0.5 | | | | | | | 0.5 | 0.9 / 2.8 | 8.0 / 8.9 | 1.9 / 2.1 |
| M8 | 5 | | | | | | | 0.2 | | | 0.9 | 35.4 | 8.2 |
| M9 | 5 | | 0.5 | 0.1 | | | | | | | 3.5 | 6.3 | 1.5 |
| M10 | 5 | | | 0.1 | | | | | 1 | | 0.8 | 14.0 | 3.2 |
| M11[1] | 10 | | | | 0.5 | | | | | | 0.8 | 18.8 | 4.4 |
| M12[1] | 10 | | 0.5 | | | | | | | | 0.8 | 5.4 | 1.3 |
| M12 | 10 | | 0.5 | | | | | | | | 2.7 | 6.8 | 1.6 |
| M13 | 5 | | 0.5 | | | | | | | | 2.7 | 7.7 | 1.8 |
| M14 | 5 | | 0.5 | | | | | 1 | | | 3.8 / 3.8 | 7.5 / 8.8 | 1.7 / 2.0 |
| M15 | 5 | | 2 | | | | | | 1 | | 2.8 | 7.0 | 1.6 |
| M16 | 5 | | 0.1 | 0.1 | | | | | 1 | | 2.8 | 10.0 | 2.3 |
| M17 | 5 | | | 0.1 | | 1 | | | | | 1.0 / 3.8 | 7.7 / 9.2 | 1.8 / 2.1 |
| M18 | 5 | | 0.5 | 0.1 | | 1 | | | | | 1.0 / 3.8 | 6.9 / 7.2 | 1.6 / 1.6 |
| M19 | 2.5 | | | 0.5 | | 1 | | | | | 1.0 / 4.7 | 7.0 / 8.7 | 1.6 / 2.0 |
| M20 | 7.5 | | 0.5 | | | 1 | | | | | 1.0 / 4.7 | 7.4 / 7.3 | 1.7 / 1.7 |
| M25 | 5 | | 0.25 | | 0.25 | 1 | | | | | 1.7 / 6.8 | 4.9 / 5.8 | 1.1 / 1.3 |
| M26[2] | 3 | | 0.6 | | | 1 | | | | | 2.9 | 6.9 | 1.6 |
| M27 | 2.5 | | 0.5 | | | | | | | | 2.8 | 10.5 | 2.4 |
| M28 | 2.5 | | 0.5 | | | 0.5 | | | | | 2.8 | 8.0 | 1.9 |
| M29 | 2.5 | | 0.5 | | | 1 | | | | | 2.8 | 6.8 | 1.6 |
| M30 | 2.5 | | 0.5 | | | 2 | | | | | 1.8 | 10.3 (sample cracking) | 1.4 |
| M31 | 2.5 | | 0.5 | | 0.5 | 1 | | | | | 1.9 / 3.7 / 4.8 | 5.9 / 8.6 / 7.7 | 1.4 / 2.0 / 1.8 |
| M32 | 2.5 | | 0.5 | | 0.25 | 1 | | | | | 1.9 / 3.7 | 8.5 / 9.4 | 2.0 / 2.2 |
| 8[2] | | | | | | 2 | | | | | 2.8 | 13.1 | 3.0 |
| 13[3] | 5 | | | 0.1 | | | | | | | 2.0 | 29.6 | 6.8 |

[1] Alloys produced at Argonne and tested as cast and annealed.
[2] Alloys cast at a commercial source to Argonne specifications. Hot pressed, rolled and annealed at Argonne.
[3] Alloys cast at a commercial source to Argonne specifications. Tested as cast and annealed.
[4] Completely oxidizes.

Although magnesium metal is resistant to corrosion when exposed to air and does not corrode badly when in contact with boiling water, its corrosion rate in contact with water at 150° C., the usual temperature to be expected in the reactors above referred to, is prohibitively high. Pure magnesium has been found to disintegrate completely after 1.7 days testing under the conditions mentioned, and the most resistant commercial alloy, AZ31, corroded at the rate of 3.2 mils per day, which is too great for use in a mechanically sound reactor that can be operated without prohibitive amounts of down time. The preceding Tables 1 and 2 show the rate of corrosion in mils per day of a number of magnesium alloys in contact with distilled, oxygen-free water at 150° C. The tests were made in small stainless steel autoclave vessels with metal samples of rolled plate or short lengths of tubing; the composition of the alloys tested is shown in the weight percent of the minor constituents, it being understood that the balance is magnesium in every case.

It will be noted that the alloy HZ32 with the lowest rate of corrosion shown above is not usable in reactors designed to produce large flux densities because of its thorium content. Even this alloy, however, is too corrodible for reactor use.

In addition to alloying, another well known expedient for reducing the rate of corrosion is the use of chemical inhibitors; salts with chromate, bichromate, borate, phosphate and fluoride anions have all been used with considerable success in protecting magnesium alloys from corrosion by water below the boiling point at atmospheric pressure, but at 150° C. only fluoride ion of those named brings about a reduction of corrosion. In addition to fluoride ion we have reason to believe, as will be explained later, that with our invention, other halide ions are useful as chemical inhibitors. Table 3 shows the results of autoclave vessel tests on samples of alloy AZ31 in distilled, oxygen-free water at 150° C. at various fluoride concentrations; for purposes of comparison the top horizontal line shows the contrasting results when no fluoride was added and the bottom horizontal line when the water had an oxygen content expressed as milliliters of oxygen per liter. The expression "Tested in a refreshed system" in the footnote indicates that fluoride ion was added continuously in order to maintain the concentration in question; otherwise it would tend to diminish presumably by reason of the formation of an insoluble magnesium compound on the surface of the samples.

Table 3.—*Effect of fluoride concentration on corrosion of magnesium alloy AZ31 at 150 C.[1]*

| Fluoride Conc., p.p.m.[2] | Test Time, Days | Corrosion Rate | |
|---|---|---|---|
| | | mg./cm.$^2$/day | mils/day |
| 0 [3] | 5 | 14.2 | 3.3 |
| 0.1 | 14 | 10.5 | 2.4 |
| 0.7 | 14 | 4.3 | 1.0 |
| 4 | 14 | 4.5 | 1.0 |
| 10 | 14 | 3.5 | 0.8 |
| 48 | 14 | 4.9 | 1.1 |
| 8+4-5 ml. O$_2$/L | 7 | 7.5 | 1.7 |

[1] Tested in refreshed system.
[2] As NaF.
[3] Closed autoclave test result included for comparison.

From the foregoing it is apparent that any addition of above 0.7 part per million reduces corrosion by a factor of about three, the slight variances shown being regarded as within the limits of experimental error. In other tests the addition of 100 parts per million of fluoride brought about substantially the same reduction. While this reduction of corrosion is desirable it is still not sufficient to make magnesium alloys suitable for use as reactor structural materials, and a further improvement is required for this purpose.

The control of pH, or of hydrogen ion concentration is, of course, well known in the chemical arts for many purposes including corrosion reduction. Such control is based upon the operation of the Mass Action Law which states that the rate of a reaction is generally dependent on the concentrations of the reactants, so that if a reaction is to be encouraged the product of the forward reaction should be removed from the reaction mixture, or if the reaction is to be discouraged the concentration of the products should be made high enough to reach the point of equilibrium. Applied to the case of magnesium corrosion inhibition, the metal and water if left to themselves react to form magnesium hydroxide until an equilibrium point is reached at a pH of about 10.5; since this reaction is to be discouraged the Mass Action Law would teach that the product, hydroxyl ions, should be added to the water in sufficient concentration to reach the equilibrium point. This has been put into actual practice by the common use of "milk of lime" as a means of protecting magnesium from corrosion; the calcium hydroxide of the lime has the same effect, of course, so far as the Mass Action Law is concerned, as that of pure magnesium hydroxide since it supplies hydroxyl ions equally well. However, for water at 150° C. this has not held good; additions of hydroxide up to the equilibrium point have resulted in no substantial change in the corrosion rates either with or without a fluoride inhibitor. On further hydroxide additions, while a slight improvement in the corrosion rate in the absence of the inhibitor was noted, it was not sufficient to accomplish the purposes of the invention. In any event, none of the methods known to the art, alloying, chemical inhibitors, pH control or any combination of these have reduced the rate of corrosion to the extent accomplished by this invention.

It is accordingly the object of the invention to reduce the corrosion of magnesium and its alloys.

It is a further object of the invention to devise a method for reducing the corrosion of magnesium sufficiently to permit its use as a structure material in aqueous nuclear reactors, and novel aqueous moderators and coolants for carrying out the invention.

It is more particularly an object of the invention to devise a method whereby the rate of corrosion of magnesium alloys in contact with water at 150° C. may be reduced to substantially less than one mil per day.

Both the foregoing objects are attained by our discovery that, contrary to the prior art teaching that the pH of the water should be increased to the equilibrium point of about 10.5 as indicated by the Mass Action Law, the rate of corrosion is reduced, not by increasing the pH, but by deliberately lowering the same to within the range of 4 to 7, and preferably to within 6 to 7. This not only constitutes an independent method of corrosion reduction which will produce good results of itself, but also appears to have the further virtue of being able to act as an improvement of other methods, especially the method of inhibition by fluoride and other halide salts. The two methods jointly produce rates of corrosion of various alloys well below any rates hitherto known, as low as 0.1 mil per day with respect of alloy M26. Many suggestions have been offered to account for this apparent violation of the Mass Action Law but due to their highly speculative character and the fact that none have been proved we have concluded that it would serve no useful purpose to set them forth in detail and we will limit ourselves to a statement of the facts which we have found empirically to be true, even though we cannot offer a theoretical explanation of our invention. Table 4 is now offered to show our results; as before, footnotes indicate that some of the tests were of the closed autoclave type, and all the others should be understood to be of the "refreshed" type, where additions of acid and of inhibitor salts were made continuously during the test to maintain the conditions of pH and anion concentrations indicated:

Table 4.—*Effect of pH on aqueous corrosion of magnesium alloys at 150° C.*

| Alloy | Test Conditions | | | Test Time | Corrosion Rate | |
|---|---|---|---|---|---|---|
| | pH | F-, p.p.m. | Cl-, p.p.m. | Days | mg./cm.²/day | mils/day |
| AZ31 | 4($H_2SO_4$) | 0 | 0 | 6 | 8.4 | 2.0 |
| | 4($H_2SO_4$) | 10 | 0 | 8 | 10.0 | 2.3 |
| | 5-6($H_2SO_4$) | 0 | 0 | 5 | 11.8 | 2.7 |
| | 5-6($H_2SO_4$) | 10 | 0 | 7 | 14.3 | 3.3 |
| | 6-7(HF) | 0.3 | 0 | 8 | 3.5 | 0.8 |
| | 6-7(HF) | 10 | 0 | 4 | 1.7 | 0.4 |
| | 6-7(HF) | 10 | 5 | 9 | 1.7 | 0.4 |
| | 10.5 [1] | 0 | 0 | 5 | 14.2 | 3.3 |
| | 10.5 | 10 | 0 | 14 | 3.5 | 0.8 |
| | 12 [1](KOH) | 0 | 0 | 2 | 9.1 | 2.1 |
| | 12 [1](KOH) | 120 | | 2 | 11.2 | 2.6 |
| | 13 [1](KOH) | 0 | 0 | 2 | 9.9 | 2.3 |
| | 13 [1](KOH) | 120 | 0 | 2 | 10.3 | 2.4 |
| Argonne M14 (Commercially Fabricated Tubing). | 6-7(HF) | 10 | 0 | 5 | 0.6-1.2 | [2] 0.1-0.3 |
| Argonne M26 (Commercially Fabricated Tubing). | 6-7(HF) | 10 | 0 | 10 | 0.6-1.2 | [2] 0.1-0.3 |
| | 6-7(HF) | 10 | 5 | 5 | 4.2 | 1.0 |
| Pretreated AZ31 [3] | 6-7($H_2SO_4$) | 0 | 0 | 4 | 4.2 | 1.0 |
| | 6-7(HF) | 0.3 | 0 | 4 | 0.5 | 0.1 |

[1] Closed autoclaves; solution not refreshed during test.
[2] Corrosion rate given as range—poor reproducibility of results due to poor quality of tubing.
[3] Pretreated 4 days, 150° C., pH 6-7 (HF)+10 p.p.m. F-, corrosion coating not removed.

As the foregoing table indicates, our invention may be carried out with either sulfuric or hydrofluoric acids although HF is to be preferred, and we have found that the fluoride inhibitor may be added in the form of sodium, potassium, ammonium, lithium and lead fluorides.

As was indicated earlier we have reason to believe that our method is effective in conjunction with other halide ion inhibitors in addition to fluoride, and combinations thereof. This is borne out by Table 4, where fluoride and chloride ion gave good results at a pH of 6-7. We, therefore, consider our invention an improvement on previous inhibitor methods employing halide ions, as well as an independent method as above set forth.

It is also understood that the invention is not to be limited by the details given herein but that it may be modified within the scope of the appended claim.

What is claimed is:

A method of reducing the rate of corrosion of magnesium alloys by water at about 150° C., which consists essentially of the addition of sodium fluoride to the water to make a concentration of about 0.7 part per million and additions from time to time of hydrofluoric acid in amounts sufficient to counteract the tendency of the pH of water in contact with magnesium to rise by maintaining continuously the pH at between 6 and 7.

References Cited in the file of this patent

UNITED STATES PATENTS 2,848,299     Kahler et al.     Aug. 19, 1958

OTHER REFERENCES

Uhlig: "Corrosion Handbook," 1948, John Wiley and Sons, N.Y., p. 241.